(12) United States Patent
Zisimopoulos et al.

(10) Patent No.: US 9,980,226 B2
(45) Date of Patent: May 22, 2018

(54) DISCOVERY RESOURCE POOL MANAGEMENT IN PROXIMITY BASED SERVICES

(71) Applicant: QUALCOMM Incorporated, San Diego, CA (US)

(72) Inventors: Haris Zisimopoulos, London (GB); Hong Cheng, Basking Ridge, NJ (US); Zhibin Wu, Bedminster, NJ (US); Sudhir Kumar Baghel, Bridgewater, NJ (US); Michaela Vanderveen, Tracy, CA (US); Shailesh Patil, Raritan, NJ (US)

(73) Assignee: QUALCOMM Incorporated, San Diego, CA (US)

(*) Notice: Subject to any disclaimer, the term of this patent is extended or adjusted under 35 U.S.C. 154(b) by 114 days.

(21) Appl. No.: 15/066,432

(22) Filed: Mar. 10, 2016

(65) Prior Publication Data

US 2016/0295510 A1    Oct. 6, 2016

Related U.S. Application Data

(60) Provisional application No. 62/142,645, filed on Apr. 3, 2015.

(51) Int. Cl.
*H04W 52/02* (2009.01)
*H04W 8/00* (2009.01)
(Continued)

(52) U.S. Cl.
CPC ....... *H04W 52/0225* (2013.01); *H04W 8/005* (2013.01); *H04W 24/02* (2013.01);
(Continued)

(58) Field of Classification Search
CPC . H04W 52/0225; H04W 8/005; H04W 24/02; H04W 48/16
See application file for complete search history.

(56) References Cited

U.S. PATENT DOCUMENTS

2015/0326362 A1* 11/2015 Xiong ................... H04W 8/005
                                                              370/336
2016/0219132 A1*  7/2016 Lee ....................... H04L 69/324
(Continued)

OTHER PUBLICATIONS

"3rd Generation Partnership Project; Technical Specification Group Services and System Aspects; Proximity-based Services (ProSe); Security aspects (Release 12)," 3GPP Standard; 3GPP TS 33.303, 3rd Generation Partnership Project (3GPP), Mobile Competence Centre ; 650, Route Des Lucioles ; F-06921 Sophia-Antipolis Cedex ; France, vol. SA WG3, No. V12.3.0, Mar. 20, 2015 (Mar. 20, 2015), pp. 1-64, XP050927968, [retrieved on Mar. 20, 2015].

(Continued)

*Primary Examiner* — Ronald B Abelson
(74) *Attorney, Agent, or Firm* — Arent Fox, LPP and Qualcomm, Incorporated

(57) ABSTRACT

A method, an apparatus, and a computer program product for wireless communication are provided that enable UEs to conserve power while involved in ProSe communication. The apparatus transmits discovery class information for ProSe communication to an A-UE and to an M-UE. The discovery class information may be transmitted from a PF in response to discovery requests. Discovery class rules may be sent from the PF as a part of service authorization. The discovery class information may be transmitted from a ProSe application server as application layer signaling. The A-UE and M-UE may use the discovery class information to select a pool of ProSe resources according to the discovery class information for transmission or monitoring of ProSe communication. The M-UE may use the information to
(Continued)

reduce the number of resource pools of resources that are monitored for ProSe communication.

12 Claims, 17 Drawing Sheets

(51) Int. Cl.
*H04W 24/02* (2009.01)
*H04W 48/16* (2009.01)

(52) U.S. Cl.
CPC ............ *H04W 48/16* (2013.01); *Y02D 70/00* (2018.01); *Y02D 70/1242* (2018.01); *Y02D 70/1262* (2018.01); *Y02D 70/142* (2018.01); *Y02D 70/144* (2018.01); *Y02D 70/162* (2018.01); *Y02D 70/21* (2018.01); *Y02D 70/26* (2018.01)

(56) References Cited

U.S. PATENT DOCUMENTS

| | | | | |
|---|---|---|---|---|
| 2016/0366577 | A1* | 12/2016 | Hu | H04W 8/005 |
| 2017/0006653 | A1* | 1/2017 | Zeng | H04W 4/06 |
| 2017/0245244 | A1* | 8/2017 | Jung | H04W 72/02 |
| 2017/0332434 | A1* | 11/2017 | Lee | H04W 8/005 |

OTHER PUBLICATIONS

Coolpad: "Discussion on Discovery Resource Pool Monitoring," 3GPP Draft; R2-150550 Discussion on discovery Resource Pool Monitoring V1, 3rd Generation Partnership Project (3GPP), Mobile Competence Centre ; 650, Route Des Lucioles ; F-06921 Sophia-Antipolis Cedex vol. RAN WG2, No. Athens, Greece; Feb. 9, 2015-Feb. 13, 2015 Feb. 8, 2015 (Feb. 8, 2015), XP050935788, Retrieved from the Internet: URL:http://www.3gpp.org/ftp/Meetings_3GPP_SYNC/RAN2/Docs/ [retrieved on Feb. 8, 2015], 3 pages.

Deutsche Telekom: "Introduction of Multiple Power Levels for different Discovery Range Classes," 3GPP Draft; R2-144224 Multiple Power Levels for Discovery, 3rd Generation Partnership Project (3GPP), Mobile Competence Centre ; 650, Route Des Lucioles ; F-06921 Sophia-Antipolis Cedex ; France , vol. RAN WG2, No. Shanghai, China; Oct. 6, 2014-Oct. 10, 2014 Sep. 26, 2014 (Sep. 26, 2014), XP050870201, Retrieved from the Internet: URL:http://www.3gpp.org/ftp/tsg_ran/WG2_RL 2/TSGR2_87bis/Docs/ [retrieved on Sep. 26, 2014] Chapter 2.1,2.3, 3 pages.

International Search Report and Written Opinion—PCT/US2016/022184—ISA/EPO—dated Sep. 6, 2016.

Samsung Electronics: "Correction on Triggering Condition and ProSe Function Processing for Match Report Procedure," 3GPP Draft; 24334 CR0021R1 (REL-12) C1-143904 REV 143648 CR 24334 Correction on Triggering Condition—and Prose Function Processing for Match Report Procedure, 3rd Generation Partnership Project (3GPP) vol. CT WG1, No. Sophia-Antipolis (France); Oct. 20, 2014-Oct. 24, 2014 Dec. 7, 2014 (Dec. 7, 2014), XP050925299, Retrieved from the Internet: URL:http://www.3gpp.org/ftp/Meetings_3GPP_SYNC/CT/Docs/ [retrieved on Dec. 7, 2014].

Sharp: "Resource Pool Monitoring for Inter Cell D2D Discovery," 3GPP Draft; R2-144193, 3rd Generation Partnership Project (3GPP), Mobile Competence Centre ; 650, Route Des Lucioles ; F-06921 Sophia Antipolis Cedex ; France vol. RAN WG2, No. ShangHai, China; Oct. 6, 2014-Oct. 10, 2014 Sep. 25, 2014 (Sep. 25, 2014), XP050870120, Retrieved from the Internet: URL:http://www.3gpp.org/ftp/tsg_ran/WG2_RL2/TSGR2 87bis/Docs/ [retrieved on Sep. 25, 2014].

* cited by examiner

DISCOVERY RESOURCE POOL MANAGEMENT IN PROXIMITY BASED SERVICES

CROSS-REFERENCE TO RELATED APPLICATION

This application claims the benefit of U.S. Provisional Application Ser. No. 62/142,645, entitled "Discovery Resource Pool Management in Proximity Based Services" and filed on Apr. 3, 2015, which is expressly incorporated by reference herein in its entirety.

BACKGROUND

Field

The present disclosure relates generally to communication systems, and more particularly, to managing discovery resource pools for proximity based services (ProSe) and related services Background Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

Different uses for ProSe may involve the use of different resource pools, which may increase power consumption by UEs involved in ProSe communication.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Different uses for ProSe may involve the use of different resource pools, which may increase power consumption by UEs involved in ProSe communication. The use of different resource pools may increase the power consumption of a UE while using ProSe, because the UE may be required to monitor all of the different resource pools. For example, currently, the SIB19 indicates that resource pools are used by all UEs, e.g., randomly. Thus, there is no capability to select a particular resource based on an application's needs. The increased power consumption due to monitoring of different pools may be problematic.

In order to conserve power while still providing the user access to ProSe, a mechanism may be provided to allow UEs to synchronize their use of a particular resource pool for related ProSe communication. Announcing UEs (A-UEs) and monitoring UEs (M-UEs) may use discovery classes associated with a pool of resources in order to synchronize their use of a particular resource pool. For example, an M-UE may use such information in order to reduce the number of resource pools that it needs to monitor. Instead of monitoring all resource pools, the M-UE may reduce the number of monitored resource pools to a target subset based on discovery class.

In an aspect of the disclosure, a method, a computer-readable medium, and an apparatus are provided. The apparatus transmits discovery class information for proximity service (ProSe) communication to an A-UE announcing user equipment (A-UE) and transmits the discovery class information for ProSe communication to a monitoring UE (M-UE).

The transmission of the discovery class information may be made from a ProSe Function (PF) to the A-UE and the M-UE in response to discovery requests.

The transmission of the discovery class information sent to the A-UE and M-UE may comprise a set of discovery class rules, the discovery class information being transmitted from the PF as a part of service authorization.

The transmission of the discovery class information may be made from a ProSe application server to the A-UE and M-UE as application layer signaling.

In another aspect of the disclosure, a method, a computer program product, and an apparatus are provided. The apparatus receives discovery class information for ProSe communication and uses the received discovery class information for at least one of transmitting and monitoring ProSe communication. The discovery class information may be received at an A-UE and used to select a pool of ProSe resources according to the discovery class information for transmission of ProSe communication. The discovery class information may be received at an M-UE and used to select a pool of ProSe resources according to the discovery class information for monitoring of ProSe communication.

In another aspect of the disclosure, a method, a computer program product, and an apparatus are provided. The apparatus monitors a plurality of pools of resources for ProSe communication, identifies ProSe communication matches, and reduces the number of pools of resources that are monitored for ProSe communication based on the identified ProSe communication matches. Identifying a ProSe communication match may include identifying a pool based on a code of the match, and the number of pools of resources may be reduced based on matched codes by continuing to monitor at least one pool of resources having a higher number of matched codes and ignoring a second pool of resources having a lower number of matched codes. In another aspect, each of the matched ProSe communication includes a class indicator for a corresponding pool of resources, and the number of pools of resources may be reduced by continuing to monitor at least one pool of resources having a class indicator associated with a higher number of matches and ignoring a second pool of resources having a class indicator associated with a lower number of matches.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
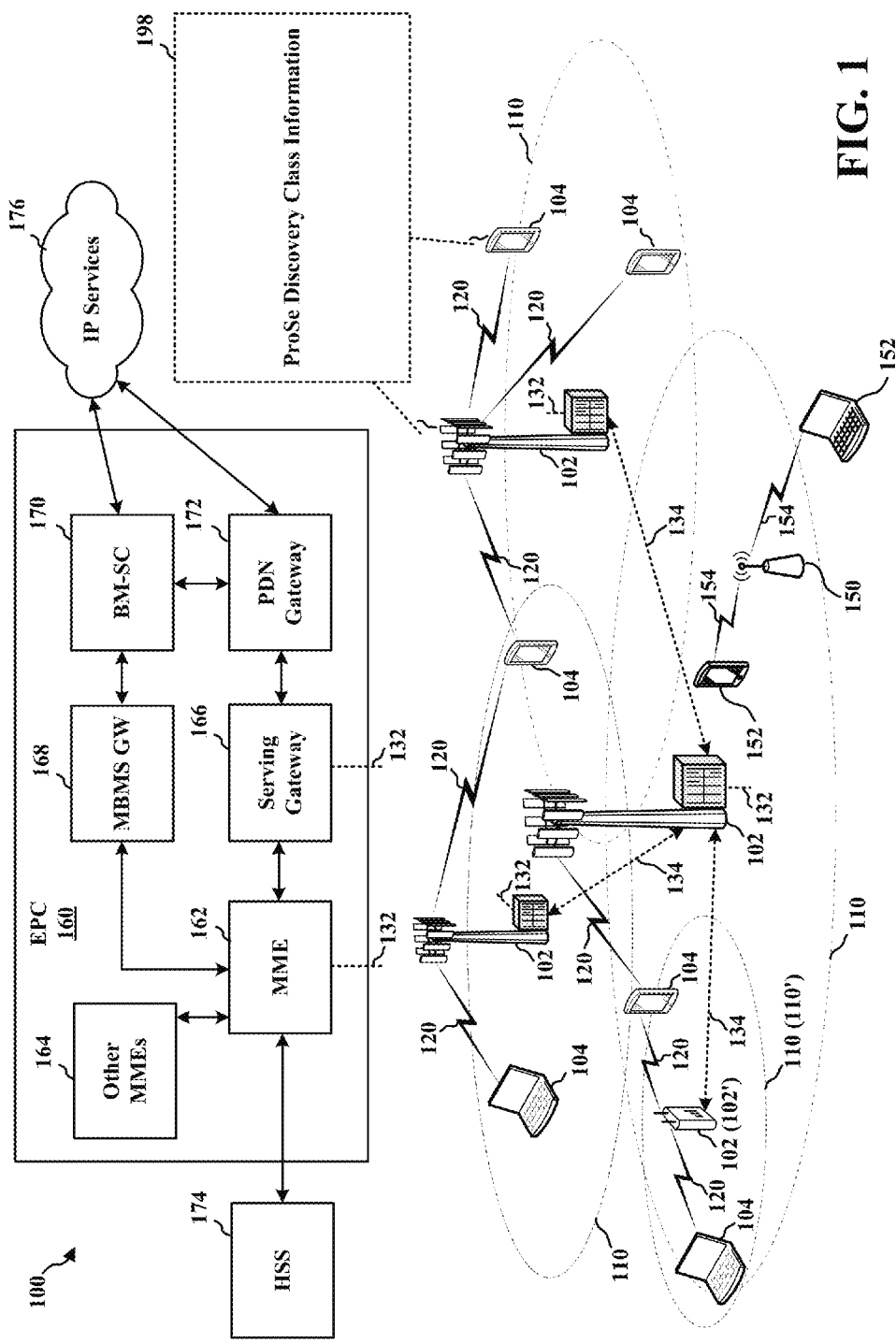
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104/eNB 102 may be configured to use ProSe discovery class information 198, either through transmission of such information or using such information in ProSe discovery.

Figure 2:
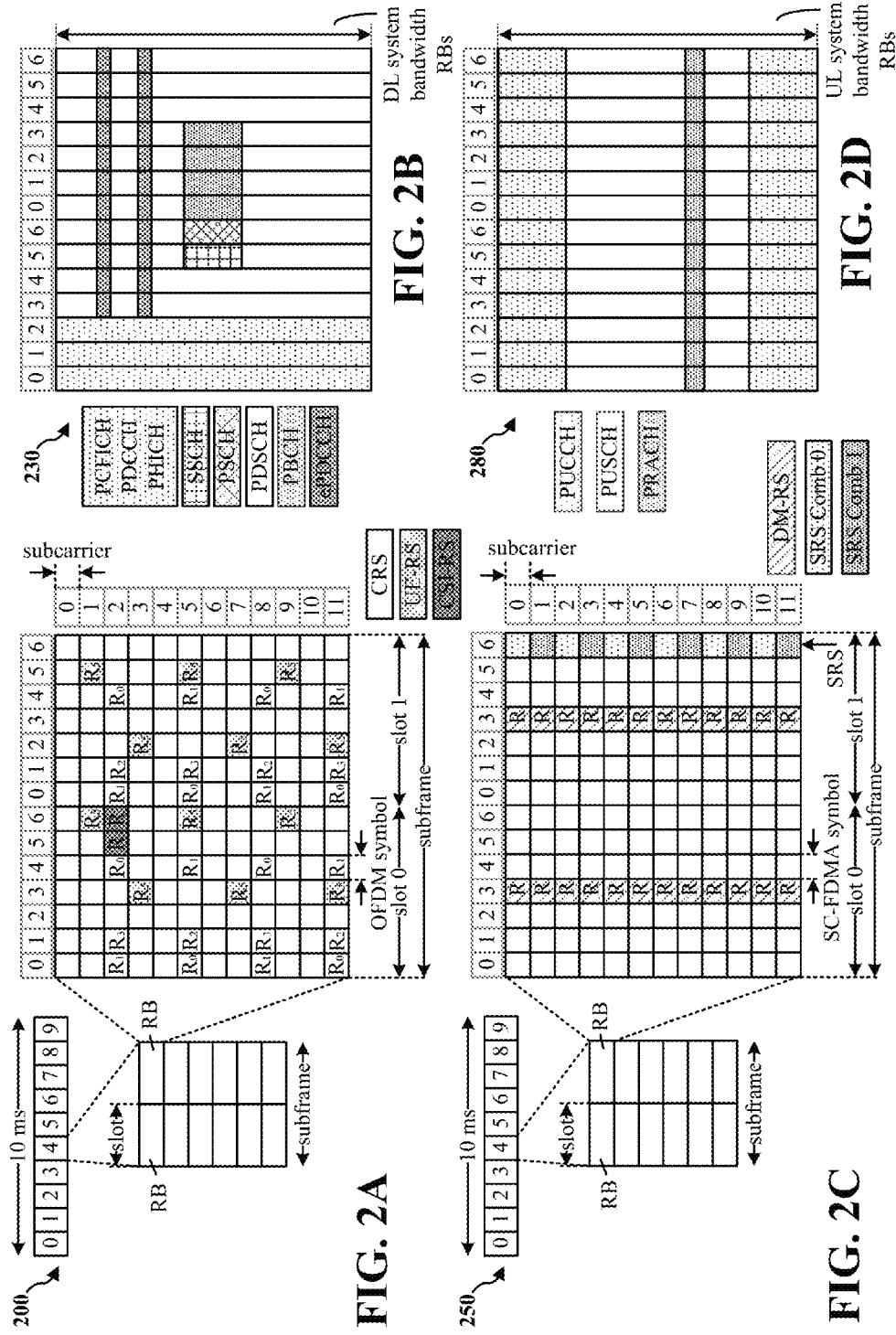
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
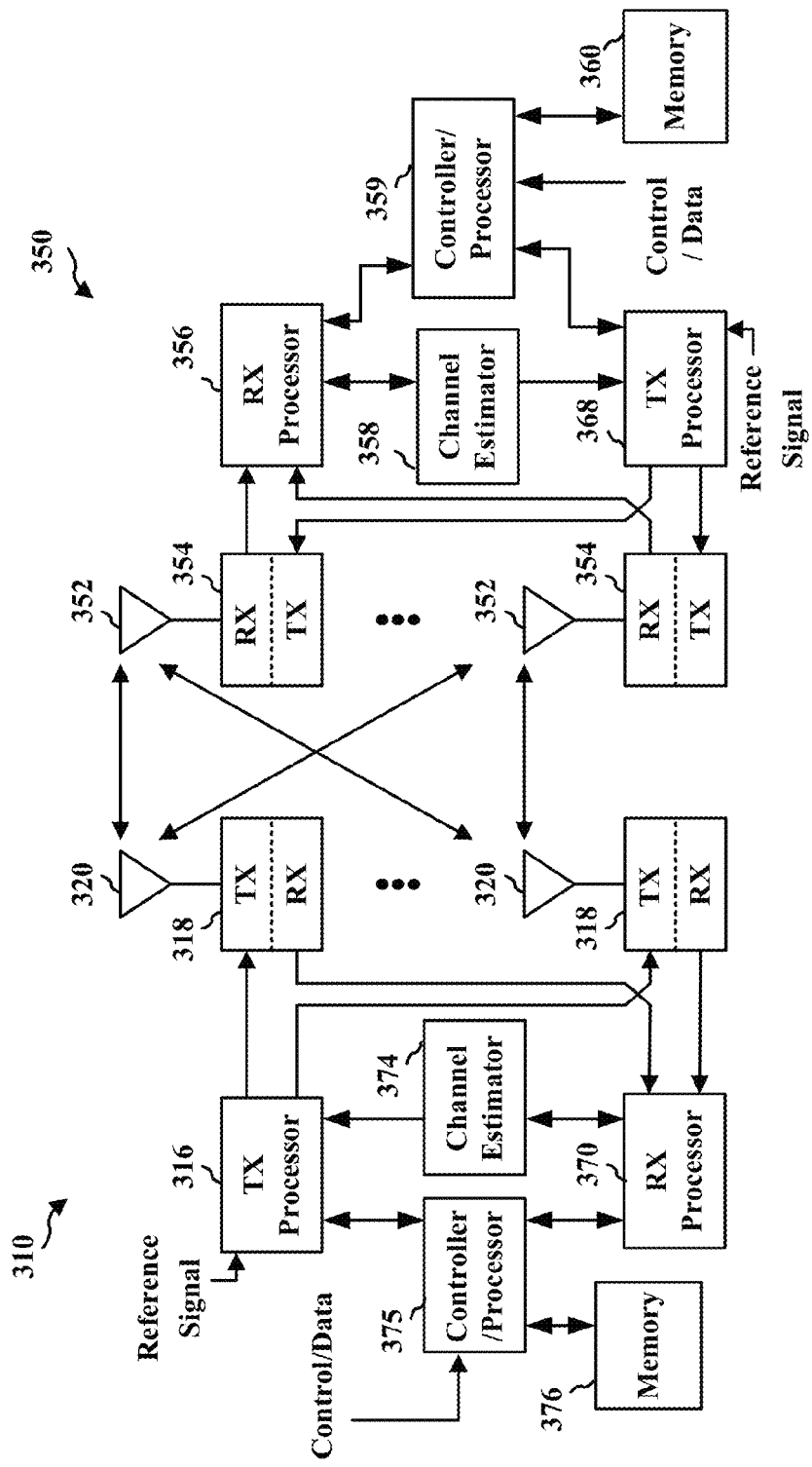
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing.

The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
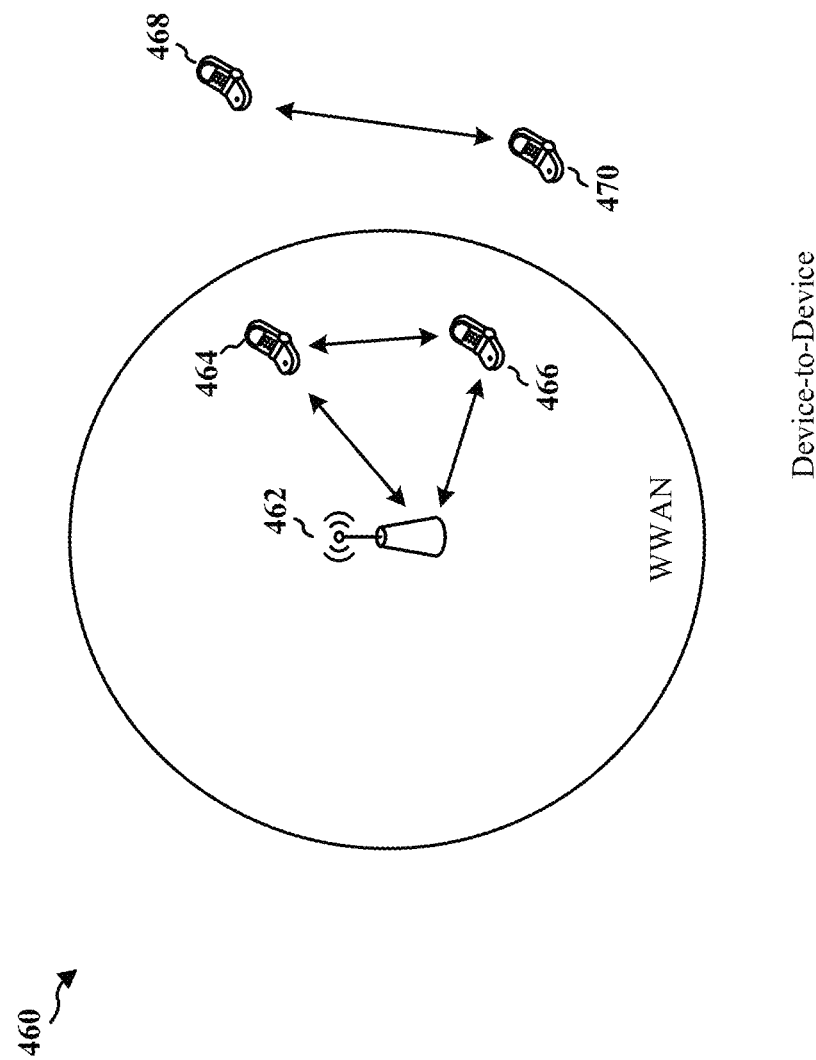
FIG. 4 is a diagram of a device-to-device communications system.

FIG. 4 is a diagram of a device-to-device (D2D) communications system 460. The D2D communications system 460 includes a plurality of UEs 464, 466, 468, 470. The D2D communications system 460 may overlap with a cellular communications system, such as for example, a WWAN. Some of the UEs 464, 466, 468, 470 may communicate together in D2D communication using the DL/UL WWAN spectrum, some may communicate with the base station 462, and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

One form of D2D communications is a proximity based service (ProSe).

A proximity service may be a service that is provided to the user of a device and/or to an application running on the device. The service is contingent on the device being in proximity to one or more other devices that support or are associated with the same service. The service may notify the user and/or the application that the device is in proximity to the one or more other devices and may provide some identification for each of these other devices—e.g., a phone number, a subscriber or user identity, a device identity—as well as information for the other devices such as the location of each of the other devices relative to the device. Alternatively (or in addition), the service may provide communication capability with the other devices (which may require permission from the respective users before being setup) in the form of voice, video, instant messaging (IM) and/or text, for example. ProSe applications may provide proximity based communication for public safety information, localized social networking, local data transfers, mobile advertisements, etc.

In the 3GPP standard, proximity based services are referred to as ProSe.

Figure 5:
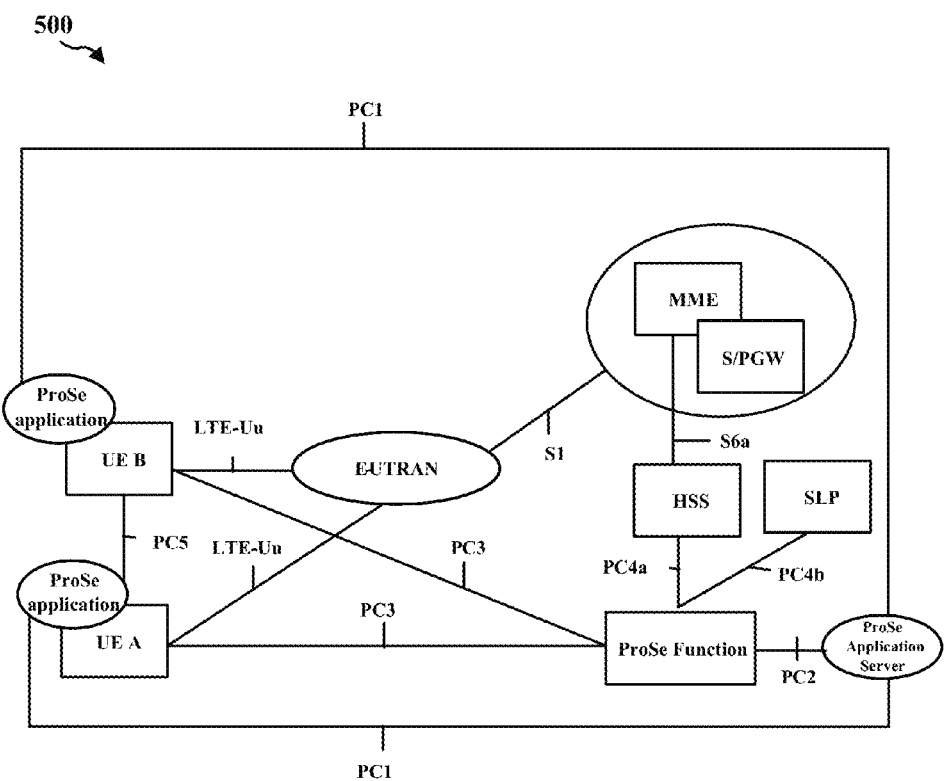
FIG. 5 is a diagram of a ProSe communications system.

FIG. 5 illustrates an example ProSe architecture 500. In this example, UEA and UEB may use a subscription to the same PLMN. PC1 forms a connection point between the ProSe application at the UEs and the ProSe Application Server. PC2 is a reference point between the ProSe Application Server and the ProSe Function (PF). The PF is the logical function that is used for network related actions required for ProSe. PC3 is a reference point between the UE and the ProSe Function. It is used to authorise ProSe Direct Discovery and ProSe Discovery requests, and perform allocation of ProSe Application Codes. PC4a is the reference point between the HSS and ProSe Function. It is used to provide subscription information in order to authorise access for ProSe Direct Discovery and ProSe Direct Communication on a per PLMN basis. PC4b is the reference point between the SUPL Location Platform (SLP) and the ProSe Function. PC5 is the reference point between ProSe-enabled UEs used for control and user plane for ProSe Direct Discovery, ProSe Direct Communication and ProSe UE-to-Network Relay. PC6 is the reference point between ProSe Functions in different PLMNs or between the ProSe Function in the HPLMN and the ProSe Function in a Local PLMN. PC7 is the reference point between the ProSe Function in the HPLMN and the ProSe Function in the VPLMN. It is used for HPLMN control of ProSe service authorization. S6a is used to download ProSe related subscription information to MME during E UTRAN attach procedure or to inform MME subscription information in the HSS has changed. S1-MME is used to provide an indication to the eNB that the UE is authorised to use ProSe Direct Discovery.

A ProSe enabled UE may support, e.g., exchange of ProSe information between ProSe enabled UE and the PF over the PC3 reference and procedures for ProSe Discovery of other ProSe enabled UEs over the PC5 reference point. ProSe Discovery may be used to detect and identify another UE within proximity using E-UTRA direct radio signals. The Discovery Request is sent by the announcing UE (A-UE) or monitoring UE (M-UE) in order to be authorized to access the discovery resources and perform ProSe Direct Discovery.

With respect to ProSe, two types of discovery models are defined: Model A and Model B.

According to Model A discovery, a given UE may be an A-UE that broadcasts information to its surrounding area. The broadcast may occur at pre-defined discovery intervals. The information that is broadcast may be an unsolicited announcement—e.g., an announcement that effectively states (e.g., to proximate devices) that "I am here." The given UE may also be an M-UE that monitors broadcasts of such information from devices (e.g., other UEs) in its proximity.

Relative to Model A discovery, Model B discovery involves communication of more specific information between devices (e.g., between a discoverer UE and a discoveree UE). According to Model B discovery, a discoverer UE sends information regarding the device(s) (or the user(s) of the device(s)) it is interested in discovering. The information may effectively ask "Who is there?" or "Are you there?" This information is received by a discoveree UE. The discoveree UE may then send a reply to the discoverer UE.

Different uses for ProSe may require the use of different resource pools. For example, with use of PC5-D to advertise Temporary Mobile Group Identity (TMGI)/cell ID from a relay to a remote UE, the communication needs to be slower than the basic relay information that is needed to achieve a fast connection. Another use may involve the use of ProSe for MTC UEs. Another use may include Model B discovery. The use of different resource pools may increase the power consumption of a UE while using ProSe, because the UE may be required to monitor all of the different resource pools. For example, currently, the SIB19 indicates that resource pools are used by all UEs, e.g., randomly. Thus, there is no capability to select a particular resource based on an application's needs. The increased power consumption due to monitoring of different pools may be problematic.

In order to conserve power while still providing the user access to ProSe, a mechanism may be provided to allow UEs to synchronize their use of a particular resource pool for related ProSe communication. A-UEs and M-UEs may use discovery classes associated with a pool of resources in order to synchronize their use of a particular resource pool. For example, an M-UE may use such information in order to reduce the number of resource pools that it needs to monitor. Instead of monitoring all resource pools, the M-UE may reduce the number of monitored resource pools to a target subset based on discovery class. This allows a UE to determine which of the resource pools to use for transmissions and/or monitoring.

For example, it may be beneficial for an A-UE to determine in which resource pool it should transmit. Similarly, it may be beneficial for an M-UE to be able to identify which resource pool it should monitor. The use of resources in discovery may be reduced by synchronizing interested UEs to transmit and/or monitor to the same resources. This may be achieved, in part, by associating a discovery class with each of a group of ProSe resources. The discovery class may be determined and signaled using any of a number of options.

A discovery class may be added to each existing transmission or reception pool. This may rely on a UE to implement the management of discovery monitoring based on different classes of resource pools. Legacy UEs might not be able to distinguish between these different classes, and would still be required to monitor all of the resource pools. Also, if legacy UEs are not able to distinguish between different discovery classes of resource pools, they will transmit on various resource pools. Thus, even UEs with the ability to distinguish discovery classes may need to monitor additional resource pools in order to detect transmissions from legacy UEs. In another example, a new set of resource pools may be established having defined discovery classes for ProSe communication. However, this will require a large amount of additional resources to establish such new resource pools.

Thus, aspects presented herein provide a way to signal discovery class information for different resource pools to UEs involved in ProSe communication. By providing this discovery class information to A-UEs and/or M-UEs, the UEs may manage their ProSe discovery in order to reduce power consumption. For example, the M-UE may reduce the number of resource pools that it monitors when it knows the discovery classes for the different resource pools.

Discovery Class Transmitted from PF in Discovery Response

In a first example, the discovery class may be allocated to the different pools of resources by the PF. The PF may apply a rule in order to determine the discovery class allocation for each pool of resources.

Figure 6:
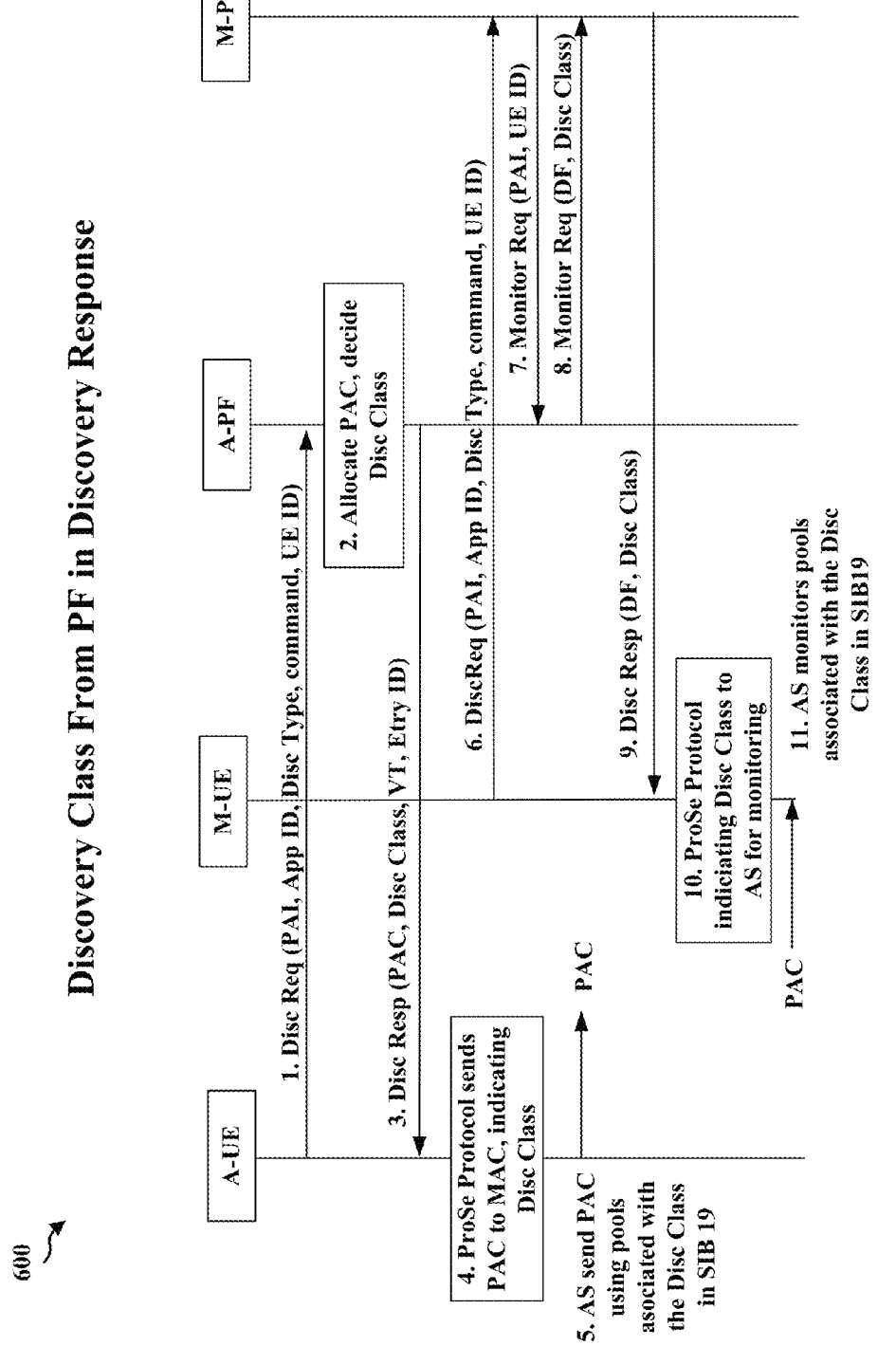
FIG. 6 is a diagram of an identification of a discovery class in ProSe communication.

FIG. 6 illustrates an example diagram 600 of communication according to this first option. FIG. 6 illustrates that the discovery class may be designated by the PF at each allocation of code. In FIG. 6, a discovery request is received from an A-UE. The announcing PF (A-PF) makes a determination regarding a discovery class for ProSe transmissions from the A-UE and reports the determined discovery class to the A-UE in the discovery response along with the ProSe Application Code (PAC). The PF may apply a static rule in determining the discovery class for transmissions from the A-UE. The ProSe protocol at the A-UE receives the indicated discovery class in the discovery response and uses the discovery class when performing ProSe transmissions. For example, SIB19 indicates the available resources for discovery and may indicate an associated discovery class for each of the available resources. This allows the A-UE to select a resource corresponding to the discovery class that it received from the A-PF for its discovery transmissions.

In this example, an M-UE may send a discovery request to the monitoring PF (M-PF). As illustrated, the M-PF may receive information regarding the allocated discovery classes from the A-PF. The discovery response from the M-PF includes a discovery class for the M-UE to use in ProSe monitoring. The ProSe protocol at the M-UE then uses the indicated discovery class to limit the pools of ProSe resources monitored by the M-UE. SIB19 indicates the resources available for discovery and may also indicate a discovery class associated with the pools of resources. Then, the M-UE may monitor the pools in the SIB19 associated with the indicated discovery class, as received from the M-PF. If the discovery class allocated to the A-UE and the discovery class reported to the M-UE are the same, the M-UE will be able to discover the A-UEs transmissions without monitoring all of the available ProSe resource pools. This allows related ProSe communication to be synchronized to a particular discovery class, which allows a M-UE to discover the transmission from the A-UE while monitoring only a subset of the available resource pools.

In this first example, the discovery class can be designated at each code allocation. Thus, the discovery classes can be applicable to each code issued. At times, the discovery request from the M-UE may be received prior to the discovery request from the A-UE. The discovery class should still be able to be synchronized between the A-UE and the M-UE, if the PF uses fixed rules in order to allocate the discovery class. For example, the determination of discovery class may be made based on any of discovery type, command, ProSe Application Identification (PAI) structure, etc. For Inter-PLMN and roaming, the A-UE and M-UE may use the same SIB19 configuration. The M-UE reads the SIB19 of the cell of the A-UE in order to monitor it. Therefore, the discovery class and resource pool mapping can be established locally.

Discovery Class Rules Transmitted from PF in Authorization

Figure 7:
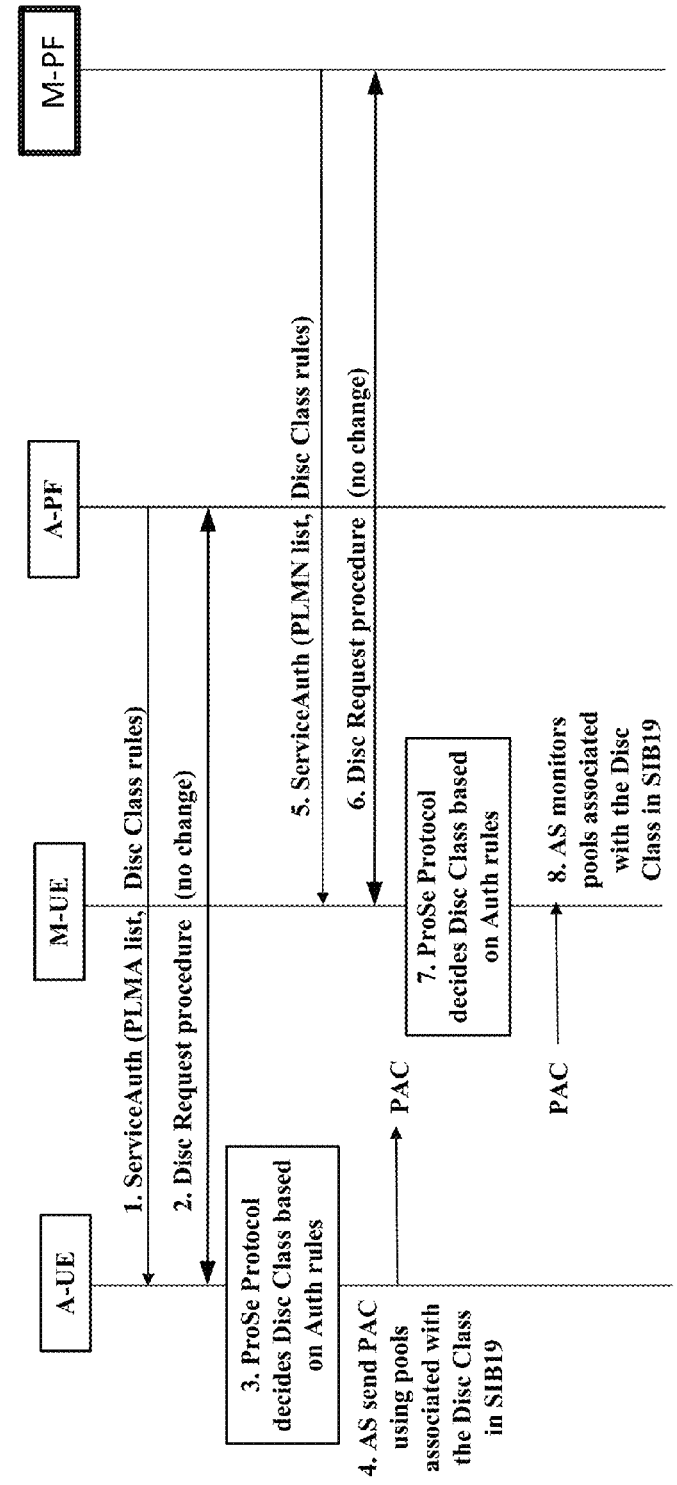
FIG. 7 is a diagram of an identification of a discovery class in ProSe communication.

In a second example, a static discovery class can be established during authorization, e.g., prior to discovery request. FIG. 7 illustrates an example diagram 700 of communication according to aspects of this second option, including static discovery based on authorization. In this example, a set of discovery class rules may be transmitted to the A-UE from the A-PF upon ProSe service authorization, e.g., along with the PLMN list. The discovery request procedure may then occur without change. The ProSe protocol at the A-UE uses the received discovery class rules in order to determine an applicable discovery class. The A-UE then selects a resource pool associated with the determined discovery class in SIB19 for its ProSe transmission.

Similarly, in FIG. 7, the M-PF transmits a set of discovery class rules to the M-UE as a part of service authorization, e.g., along with a PLMN list. The discovery request procedure between the M-PF and the M-UE then proceeds normally. The ProSe protocol at the M-UE uses the received discovery class rules to make a determination of which resource pools to monitor for ProSe communication. If the ProSe application used at the A-UE and M-UE are related, they should determine the same discovery class based on the received set of rules.

While this example, does not allow for a discovery class designation per code allocation, as in the FIG. 6, the discovery class rules can be set per PLMN and sent to the A-UE or M-UE at service authorization. This allows an A-UE HPLMN and M-UE HPLMN to synchronize the discovery class rules even when inter-PLMN and roaming support are needed. In order for the LPLMN/VPLMN to provide the same rules to the A-UE and M-UE, the mapping rule may need to be a static rule set at the PLMN level. As another example, a standard rule set may be used across different LPMNs in order to avoid issues with inter-PLMN and roaming support.

The A-UE and M-UE may also need to implement the rule set mapping in the same manner in order to ensure that the discovery class determined by both UEs for a particular type of ProSe communication matches.

M-UE Reduces Monitored Pools Based on Matched Codes

Figure 8:
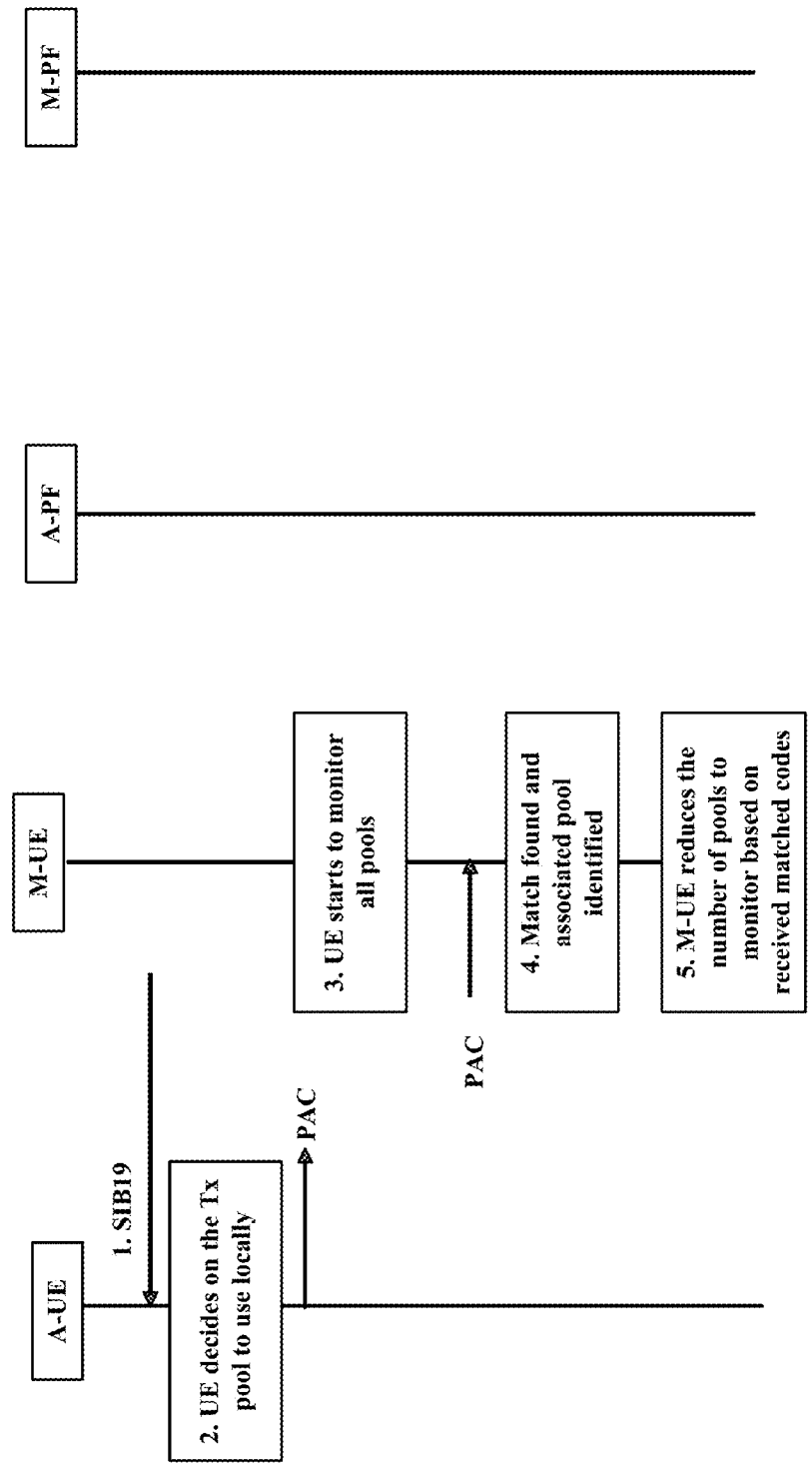
FIG. 8 is a diagram of a discovery management in ProSe communication.

In a third example, an implementation may rely on the M-UE to reduce the number of resource pools that it monitors. FIG. 8 illustrates an example diagram 800 of communication according to this third example. In FIG. 8 the M-UE to reduce the number of resource pools that it monitors in order to conserve power by building a knowledge of which pools are likely to contain transmissions of interest. In FIG. 8, the A-UE decides which ProSe transmission pool to use locally. Thus, the SIB19 indicates the available resource pools and the A-UE selects one for PAC transmissions.

The M-UE begins by monitoring multiple resource pools, e.g., the M-UE may initially monitor all of the available resource pools. As the M-UE receives communication it may determine communication that matches its interest. As matches are found, the UE may identify the resource pool used to transmit the communication. This may include identifying a discovery class for the resource pool. After receiving a number of matches, the M-UE may begin to reduce the number of monitored pools based on the identified matched codes. The M-UE may select resource pools to ignore based on a low occurrence of matches in that resource pool. Alternately, the M-UE may select particular resource pools to monitor based on a high occurrence of matches. Thus, the M-UE may determine to continue to monitor only the resource pools having a higher number of matches and may discontinue monitoring resource pools having a lower number of matches. In one example, the M-UE may continue to monitor one the resource pool having a highest occurrence of matches.

This implementation does not require any action from the PF. Instead, it relies on the M-UE building a knowledge of the type of communication transmitted in the different resource pools by identifying codes matching its interests.

M-UE Reduces Monitored Pools Based on Indicated Class/Pool

Figure 9:
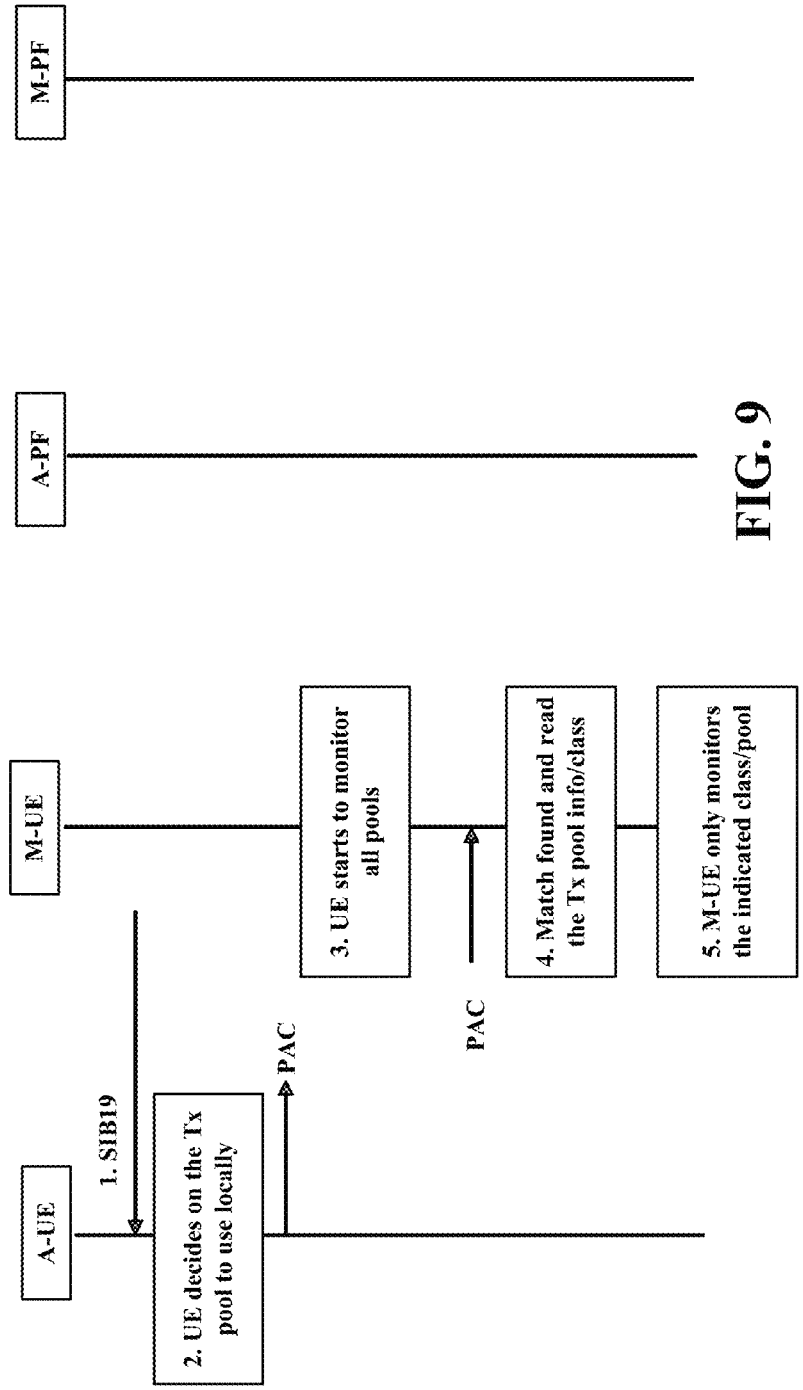
FIG. 9 is a diagram of a discovery management in ProSe communication.

In a fourth example related to the third example, a discovery class may be indicated by the A-UE over-the-air, e.g., via PC5. FIG. 9 illustrates an example diagram 900 of communication according to this fourth example. This example is similar to that in FIG. 8. The A-UE selects one of the available resource pools from the SIB19. This may occur without any direction from the PF. In FIG. 8, the A-UE adds an indication of the local transmission pool that it has determined to use to its PC5 message. The indication may include a discovery class for the resource pool and/or for the transmission. Similar to the process in FIG. 8, the M-UE begins by monitoring multiple resource pools, and may monitor all of the available pools. When a communication matches is found, the M-UE reads the transmission pool information or discovery class information provided by the A-UE. The M-UE may then select class(es)/pool(s) to monitor based on the class/pool indicated read from the matched code. As the M-UE continues to identify matches, it is able to build a knowledge of the pools/classes in which code of interest is likely to be transmitted.

The M-UE may then reduce the number of resource pools that it monitors by discontinuing monitoring of resource pools having a lower occurrence of matches, as described in connection with FIG. 8.

Discovery Class Indicated in Application Layer Signaling

Figure 10:
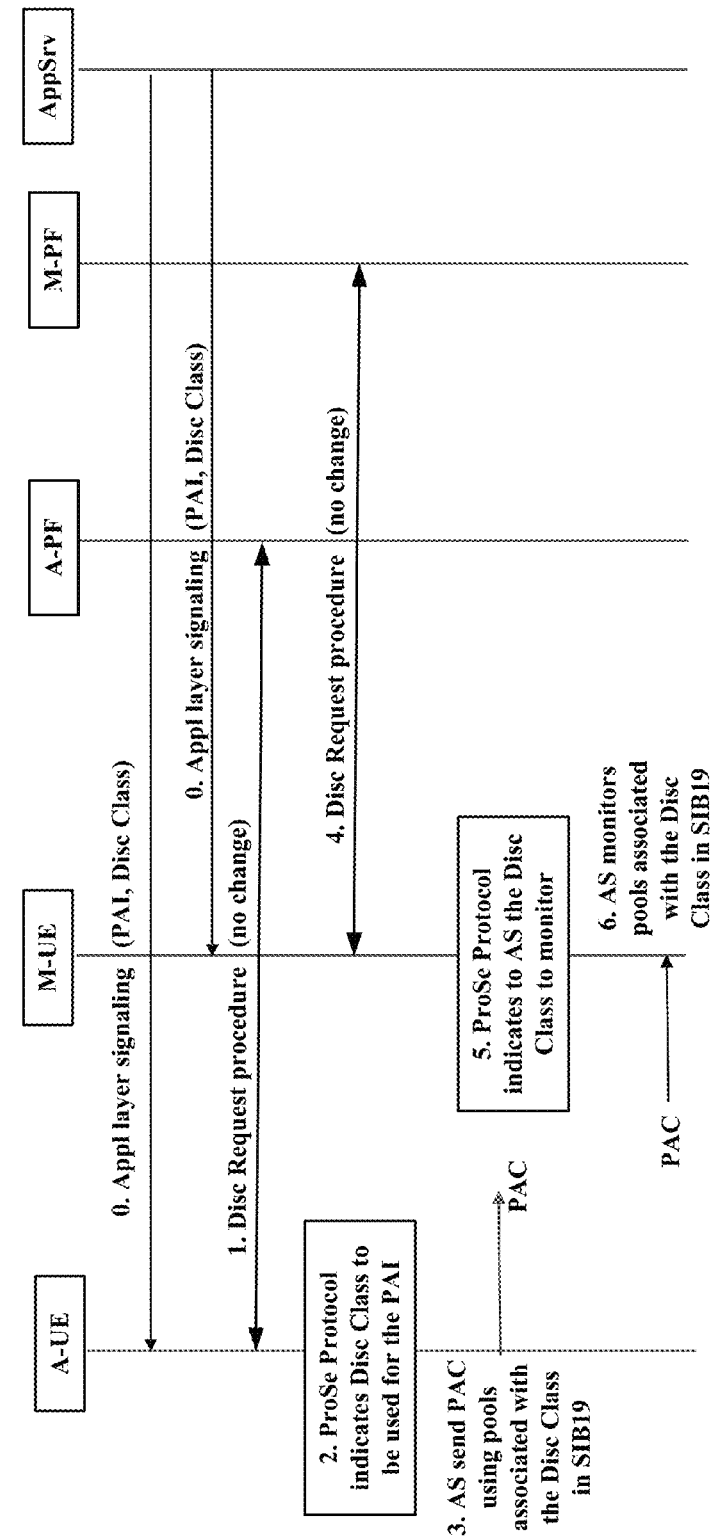
FIG. 10 is a diagram of an identification of a discovery class in ProSe communication.

In a fifth example, an application layer determination may be made regarding the discovery class. FIG. 10 illustrates an example diagram 1000 of communication according to this fifth example. In FIG. 10, discovery class information is transmitted to the A-UE and the M-UE from the application server as part of the application layer signaling, rather than from the A-PF or the M-PF, as occurs in FIGS. 6 and 7. The discovery request procedure with the PF may proceed normally for the A-UE and the M-UE.

The ProSe protocol at the A-UE indicates a discovery class to be used for ProSe transmissions based on the discovery class received from the application server. The UE transmits ProSe communication associated with the ProSe application using resources associated with the discovery class indicated by the application server. The discovery class may be indicated along with the available resource pools in SIB19. Thus, the UE selects an appropriate resource pool associated with the discovery class that it receives from the application server.

The ProSe protocol at the M-UE indicates a discovery class to be used to monitor for ProSe communication based on the discovery class received from the application server. Then, the M-UE monitors resource pools associated with the discovery class discovery class. The M-UE may determine the resource pools associated with the indicated discovery class from the SIB19. As the discovery class information is transmitted from the application server, the A-UE and M-UE may need to share the same application server in order to synchronize their ProSe discovery based on discovery class. Additionally, in this example, the application server needs to be aware of the discovery class information in order to transmit it to the A-UE an M-UE. Thus, the discovery class for the ProSe application may be selected based on application layer information.

Aspects of this fifth example may be used in connection with the first and second examples, e.g., as described in connection with FIGS. 6 and 7

By managing the use of different pools of ProSe resources according to a discovery class, using any of the aspects described in connection with FIGS. 6-10 discovery may be optimized by synchronizing the transmission and monitoring of ProSe communication to the same pool of resources. This allows an M-UE to conserve power by reducing the number of resources that it needs to monitor in order to discover ProSe transmissions of interest.

Figure 11:
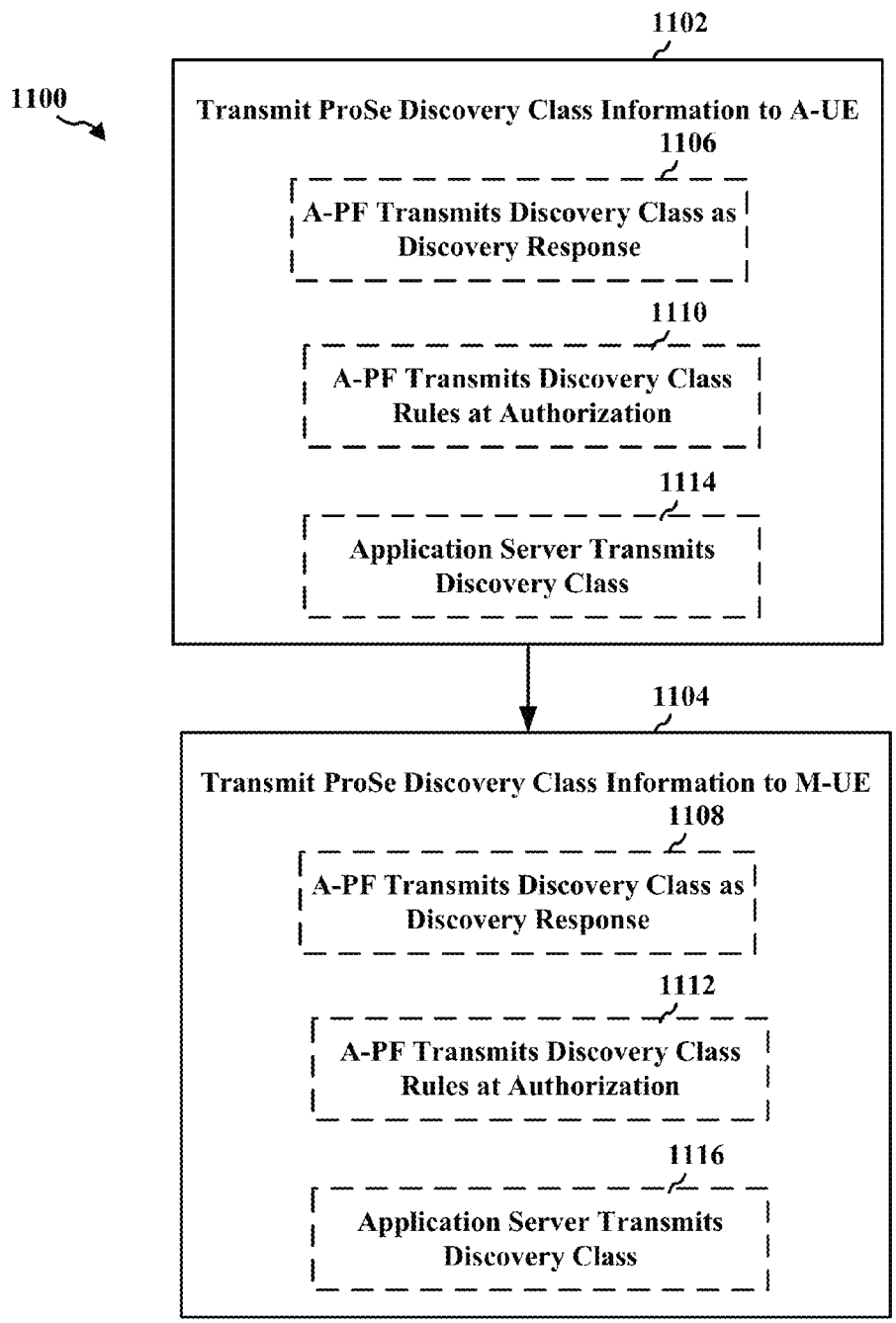
FIG. 11 is a flow chart of a method of wireless communication.

FIG. 11 is a flow chart 1100 of a method of wireless communication. The method may be performed by an eNB (e.g., the eNB 102, 310, 462 the apparatus 1202/1202'). At 1102, the eNB transmits discovery class information for communication to an A-UE. At 1104, the eNB transmits the discovery class information for ProSe communication to an M-UE. Transmitting the discovery class information to the A-UE and to the M-UE assists them in synchronizing their communication in a manner that does not require the M-UE to monitor all available resource pools. Thus, the M-UE can conserve power through targeted monitoring of specific resource pools most likely to have transmissions of interest for that M-UE.

At 1106, the transmission of the discovery class information may be made from a PF, e.g., an A-PF, to the A-UE in response to a discovery request from the A-UE. As described in connection with FIG. 6, the A-PF may allocate resources within a pool for the A-UE to transmit ProSe communication, in response to a discovery request from the A-UE. Along with the transmission of the PAC, the A-PF may also designate a discovery class for the transmission.

Similar to the transmission of the discovery class information to the A-UE at 1106, the transmission of the discovery class information to the M-UE at 1108 may be made from the PF, e.g., M-PF, in response to a discovery request from the M-UE. Providing this discovery class information to the M-UE enables the M-UE to target resource pools associated with the discovery class in order to reduce the amount of resource pools that it monitors.

As another option, at 1110, the transmission of the discovery class information sent to the A-UE may comprise a set of discovery class rules transmitted from the A-PF to the A-UE as a part of service authorization. As described in connection with FIG. 7, the A-PF may provide each A-UE with a set of discovery class rules. The A-UE may then use the set of rules in order to determine a discovery class for their ProSe transmissions. The A-UE may then select resources from the SIB19 for transmission from using the determined discovery class.

At 1112, the transmission of the discovery class information sent from the PF, e.g., M-PF, to the M-UE may comprise the set of discovery class rules previously transmitted to the A-UE. The discovery class rules may be transmitted to the M-UE as a part of service authorization. The M-UE may use the set of rules to determine a class for monitoring. Then, the M-UE may select at least one pool of resources from the SIB19 associated with the determined class. The M-UE monitors the selected resource pool, and may choose to ignore pools of resources not associated with the determined class, thereby enabling it to conserve power.

At 1116 the transmission of the discovery class information may be made from a ProSe application server to the A-UE as application layer signaling. Similarly, at 1118, the transmission of the discovery class information may be made from the ProSe application server to the M-UE as application layer signaling. As described in connection with FIG. 10, a discovery class for ProSe transmissions associated with a ProSe application can be determined based on application layer information. Thus, the application server may send an indication to the ProSe protocol at the A-UE and M-UE, respectively that indicates a discovery class to be used for the ProSe communication. The A-UE may select a resource from a pool associated with the discovery class, and the M-UE may monitor a resource pool associated with the discovery class. The M-UE may reduce its amount of monitoring by ignoring resource pools in the SIB19 that are not associated with the discovery class.

Figure 12:
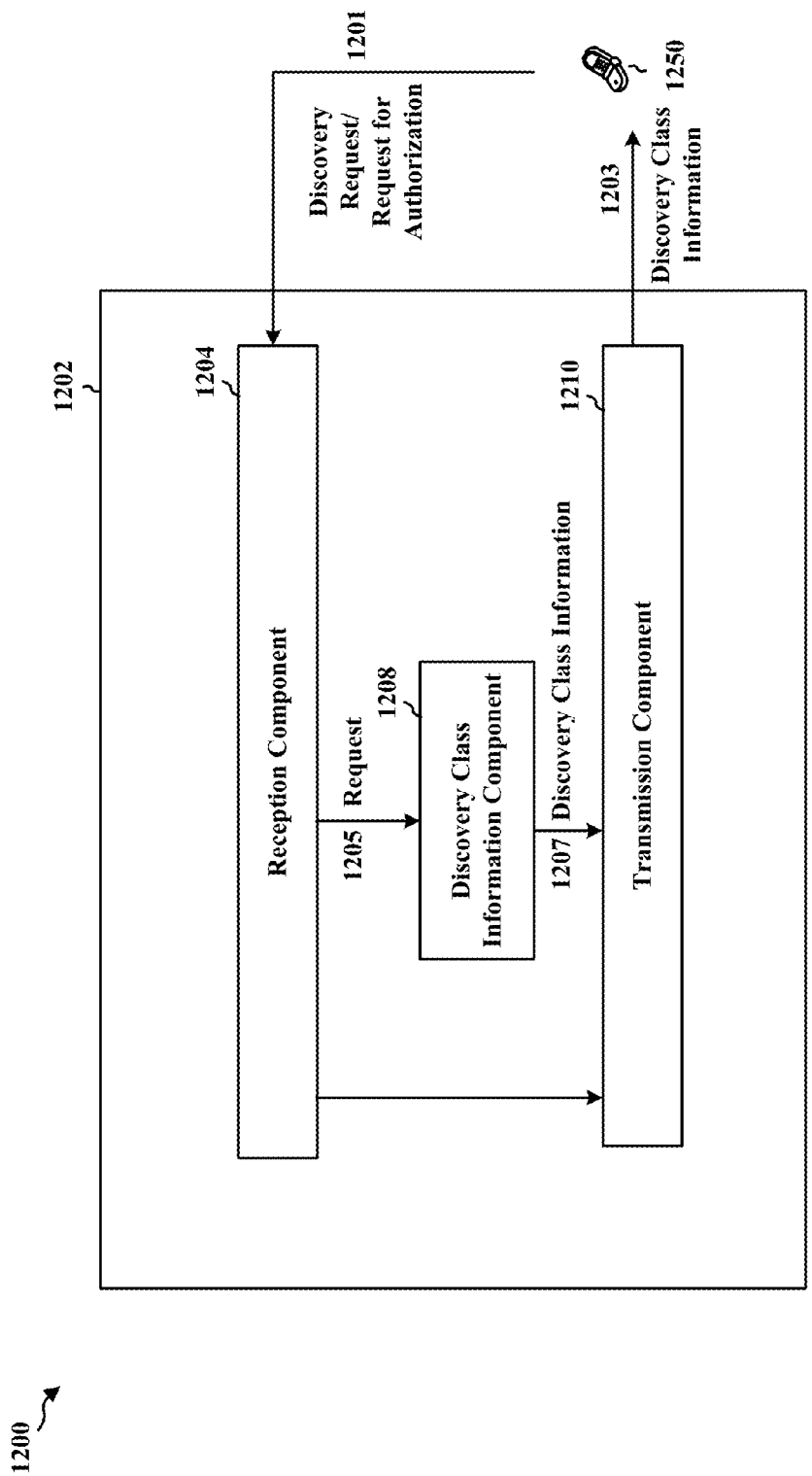
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a network device, such as an eNB. The apparatus includes a reception component 1204 that receives communication 1201 from a UE 1250. The reception component 1204 may receive, e.g., a discovery request or a request for authorization from the UE 1250. The apparatus includes a transmission component 1210 that transmits communication 1203 to UE 1250. The apparatus includes a discovery class information component 1208 that determines discovery class information for transmission to the UE 1250 by transmission component 1210. The discovery class information component 1208 outputs the discovery class information at 1207 to the transmission component for transmission to the UE 1250. The discovery class information component may make the determination based on information received at the reception component 1204 at provided to the discovery class information component at 1205. For example, the transmission of discovery class information may be triggered by authorization, by a discovery request, as part of application layer signaling, etc.

The apparatus may include additional components that perform each of the blocks of the algorithm in the aforementioned flow chart of FIG. 11. As such, each block in the aforementioned flow charts of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
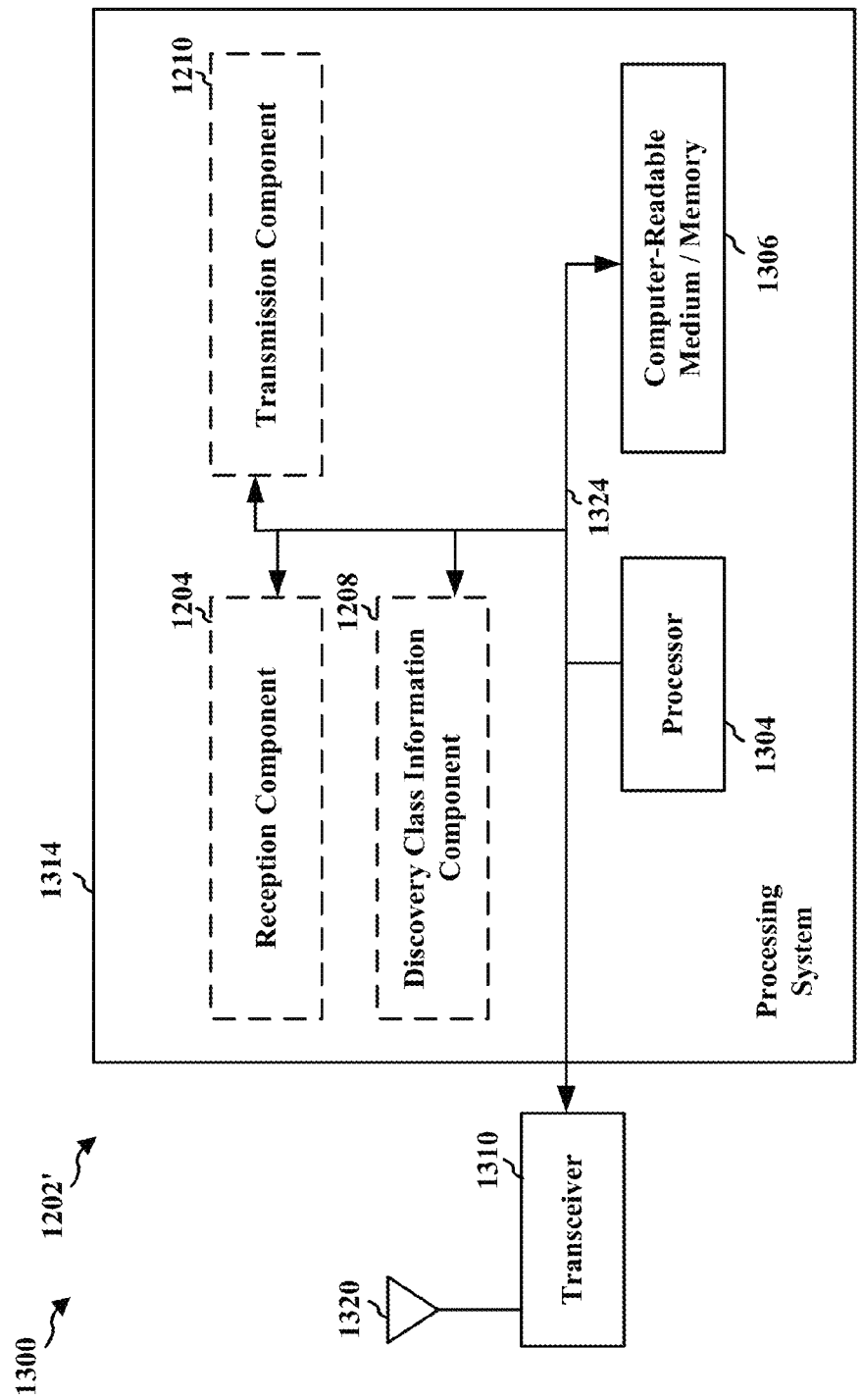
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1304, 1208, and 1210, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1210, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system further includes at least one of the components 1204, 1308, and 1210. The components may be software components running in the processor 1304, resident/stored in the computer readable medium/memory 1306, one or more hardware components coupled to the processor 1304, or some combination thereof. The processing system 1314 may be a component of the eNB 310 and may include the memory 376 and/or at least one of the TX processor 316, the RX processor 370, and the controller/processor 375.

In one configuration, the apparatus 1202/1202' for wireless communication includes means for transmitting discovery class information for ProSe communication, e.g., transmission component 1210 and/or discovery class information component 1208. The means for transmitting may be configured to transmit the discovery class information to an A-UE and to an M-UE. Available resource pools may be signaled in SIB19, which may also indicate a discovery class for any of the resource pools. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 14:
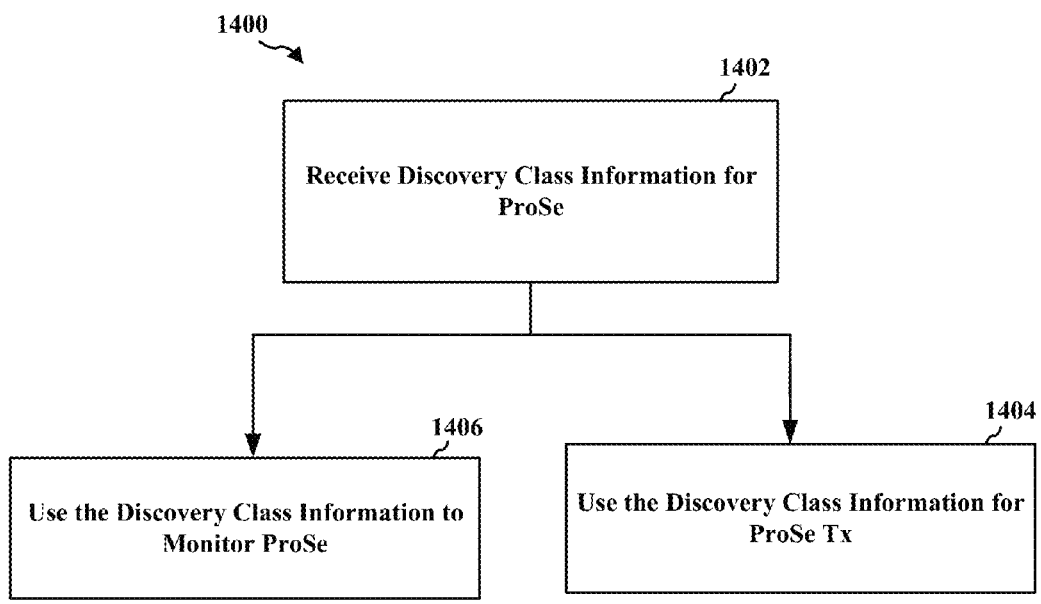
FIG. 14 is a flow chart of a method of wireless communication.

FIG. 14 is a flow chart 1400 of a method of wireless communication. The method may be performed by UE (e.g., the UE 104, 350, 464/466/468/470, 1602/1602'). At 1402, the UE receives discovery class information for ProSe communication. The UE may use the received discovery class information for transmitting ProSe communication at 1404 and/or and monitoring ProSe communication at 1406.

In one example, the UE may be an A-UE. The A-UE may use the received discovery class information to select a pool of ProSe resources according to the discovery class information for transmission of ProSe communication, e.g., at 1404. The A-UE may receive an indication of available pools of resources in SIB19, which may also indicate a discovery class associated with at least one of the available pools resources.

In another example, the UE may be an M-UE. The M-UE may use the discovery class information to select a pool of ProSe resources according to the discovery class information for monitoring of ProSe communication, e.g., at 1406. The M-UE may receive an indication the pools of resources in SIB19, which may also indicate a discovery class associated with at least one of the available pools resources.

The discovery class information may be a discovery class allocation that is received by the A-UE or the M-UE from the PF. The discovery class allocation may be received in response to a discovery request, as described in connection with FIG. 6.

In another example, the discovery class information may be a set of discovery class rules received from the PF as a part of service authorization, as described in connection with FIG. 7.

In another example, the discovery class information may be a discovery class received as application layer signaling from a ProSe application server, as described in connection with FIG. 10.

Figure 15:
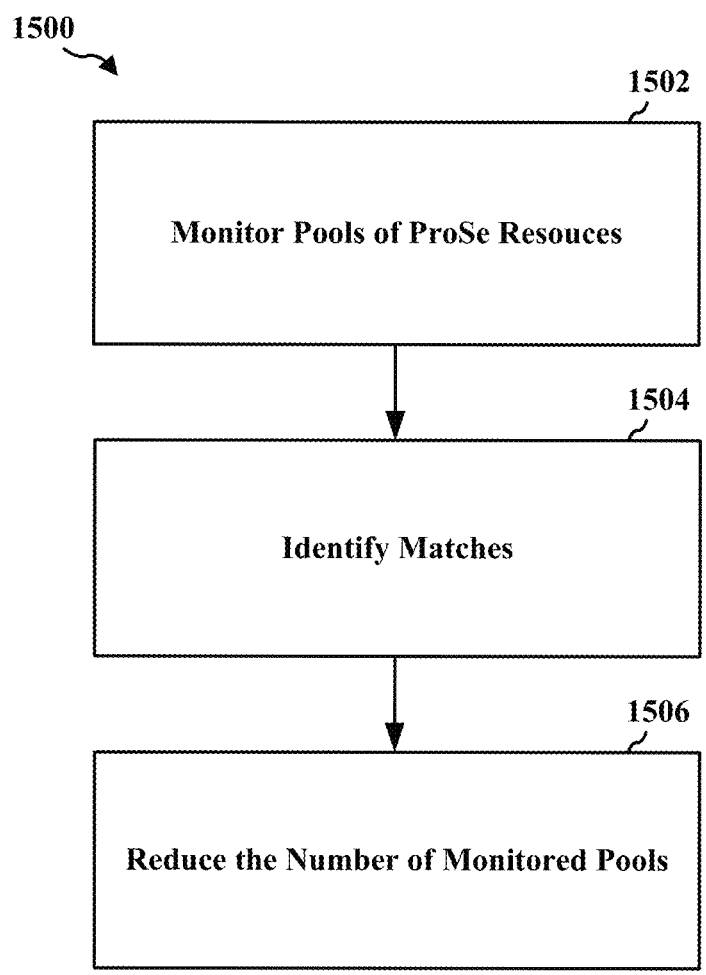
FIG. 15 is a flow chart of a method of wireless communication.

FIG. 15 is a flow chart 1500 of a method of wireless communication. The method may be performed by UE such as an M-UE (e.g., the UE 650, 1602/1602'). At 1502, the M-UE monitors a plurality of pools of resources for ProSe communication. For example, the M-UE may initially monitor all of the available pools of resources. At 1504, the M-UE identifies ProSe communication matches. Based on the identified matches, the M-UE may build its knowledge of which resource pools are likely to have transmissions of interest. At 1506, the M-UE reduces the number of pools of resources that are monitored for ProSe communication based on the identified ProSe communication matches.

Identifying the matches may include identifying a resource pool based on a code of the match, as described in connection with FIG. 8. The number of pools of resources may be reduced based on matched codes by continuing to monitor at least one pool of resources having a higher number of matched codes and ignoring a second pool of resources having a lower number of matched codes.

In another example, the ProSe communication match may include a class indicator for a corresponding pool of resources, as described in connection with FIG. 9. Thus, the number of pools of resources may be reduced by continuing to monitor at least one pool of resources having a class indicator associated with a higher number of matches and ignoring a second pool of resources having a class indicator associated with a lower number of matches.

Figure 16:
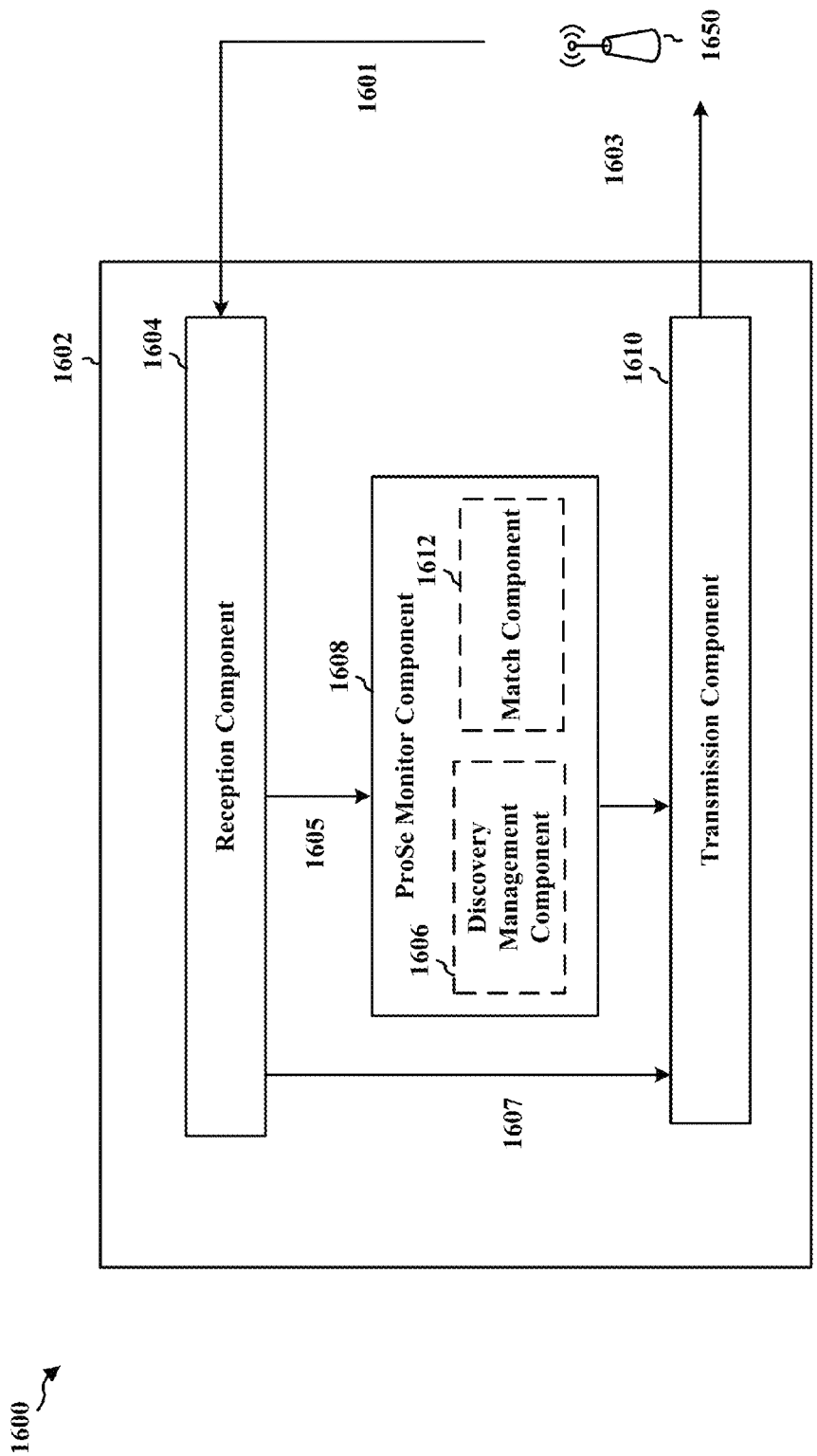
FIG. 16 is a conceptual data flow diagram illustrating the data flow between different means/components in an exemplary apparatus.

FIG. 16 is a conceptual data flow diagram 1600 illustrating the data flow between different components/means/components in an exemplary apparatus 1602. The apparatus may be a UE. The apparatus includes a reception component 1604 that receives communication 1601 from eNB 1650 as well as from other UEs, a transmission component 1610 that transmits communication 1603 to eNB 1650 as well as to other UEs, and a ProSe monitor component 1608 that monitors a plurality of pools of resources for ProSe communication. The reception component 1604 may receive discovery class information for ProSe communication. This discovery class information may be used for transmitting ProSe communication, e.g., via transmission component 1610 and may be used for monitoring for ProSe communication, e.g., via ProSe monitoring component 1608. Thus, the reception component may output discovery class information to the ProSe monitoring component at 1605 and/or transmission component at 1607.

The ProSe monitoring component 1608 may further include a match component 1612 configured to identify ProSe communication matches and a discovery management component 1606 configured to reduce the number of pools of resources that are monitored for ProSe communication based on the identified ProSe communication matches. The apparatus may reduce the number of monitored pools, e.g., as described in connection with FIGS. 11 and 12.

The apparatus may include additional components that perform each of the blocks of the algorithm in the aforementioned flow charts of FIGS. 14 and 15. As such, each block in the aforementioned flow charts of FIGS. 14 and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
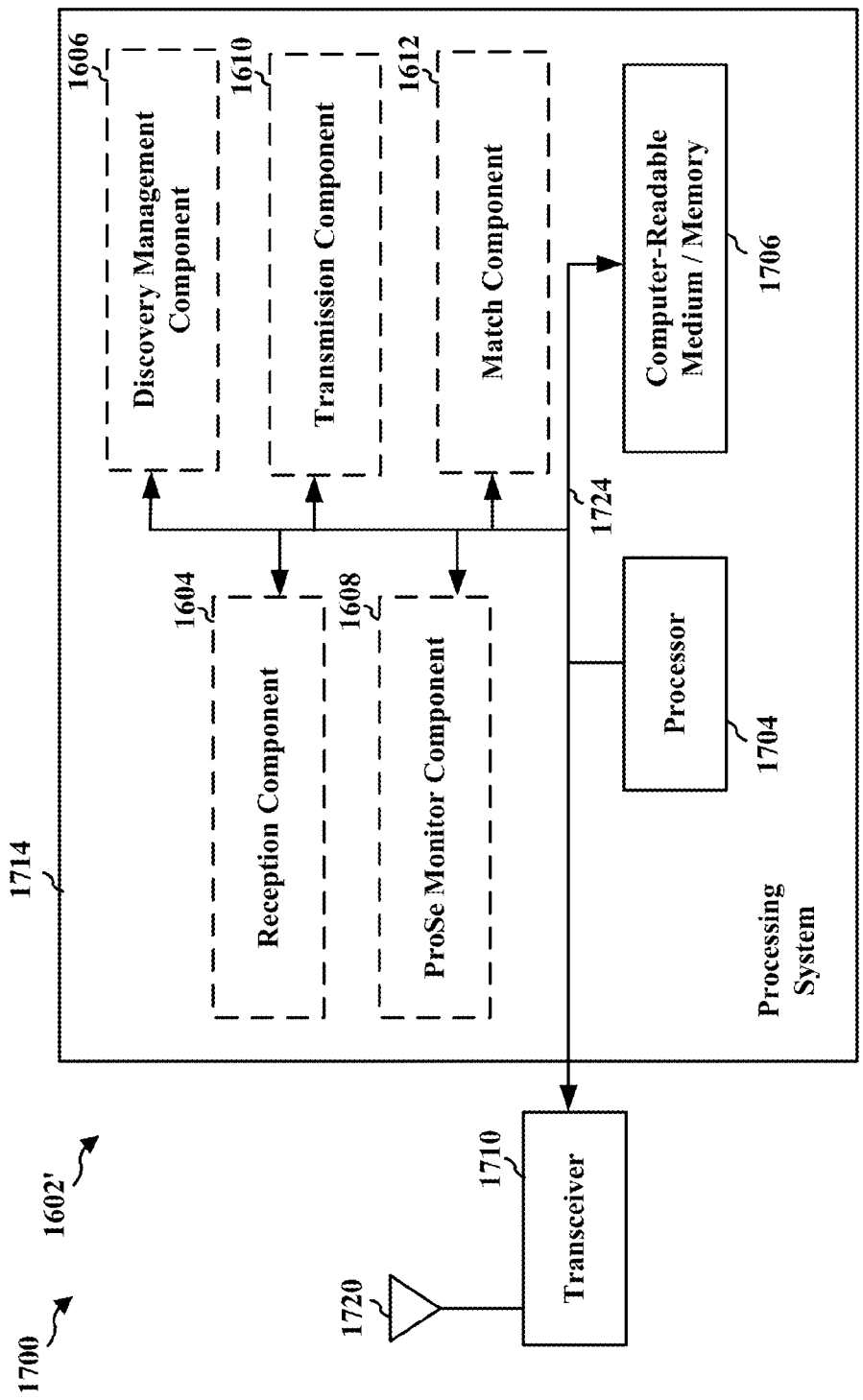
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1608, 1610, and the computer-readable medium/memory 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714, specifically the reception component 1604. In addition, the transceiver 1710 receives information from the processing system 1714, specifically the transmission component 1610, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described supra for any particular apparatus. The computer-readable medium/memory 1706 may also be used for storing data that is manipulated by the processor 1704 when executing software. The processing system further includes at least one of the components 1604, 1608, 1610. The components may be software components running in the processor 1704, resident/stored in the computer readable medium/memory 1706, one or more hardware components coupled to the processor 1704, or some combination thereof. The processing system 1714 may be a component of the UE 350 and may include the memory 360 and/or at least one of the TX processor 368, the RX processor 356, and the controller/processor 359.

In one configuration, the apparatus 1602/1602' for wireless communication includes means for receiving discovery class information for ProSe communication, e.g., reception component 1604 and/or ProSe monitor component, and means for using the received discovery class information for at least one of transmitting and monitoring ProSe communication, e.g., transmission component 1610, reception component 1604, and ProSe communication component 1608. The apparatus may include means for monitoring a plurality of pools of resources for ProSe communication, e.g., ProSe monitor component 1608, means for identifying ProSe communication matches, e.g., match component 1612, and means for reducing the number of pools of resources that are monitored for ProSe communication based on the identified ProSe communication matches, e.g., discovery management component 1606. The aforementioned means may be one or more of the aforementioned components of the apparatus 1602 and/or the processing system 1714 of the apparatus 1602' configured to perform the functions recited by the aforementioned means. As described supra, the processing system 1714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   transmitting discovery class information for proximity service (ProSe) communication from at least one of a ProSe Function (PF) and a ProSe Application Server to an announcing user equipment (A-UE), wherein the discovery class information indicates an associated pool of resources for ProSe communication, wherein the transmission of the discovery class information is made from the PF to the A-UE in response to a first discovery request from the A-UE; and
   transmitting the discovery class information for ProSe communication from at least one of the PF and the ProSe Application Server to a monitoring UE (M-UE), wherein the transmission of the discovery class information is made from the PF to the M-UE in response to a second discovery request from the M-UE.

2. A method of wireless communication, comprising:
   transmitting discovery class information for proximity service (ProSe) communication from at least one of a ProSe Function (PF) and a ProSe Application Server to an announcing user equipment (A-UE), wherein the discovery class information indicates an associated pool of resources for ProSe communication, wherein the transmission of the discovery class information sent to the A-UE comprises a set of discovery class rules, the discovery class information being transmitted from the PF to the A-UE as a part of service authorization of the A-UE; and
   transmitting the discovery class information for ProSe communication from at least one of the PF and the ProSe Application Server to a monitoring UE (M-UE), wherein the transmission of the discovery class information sent from the PF to the M-UE comprises the set of discovery class rules, the discovery class information being transmitted to the M-UE as a part of service authorization of the M-UE.

3. A method of wireless communication, comprising:
   transmitting discovery class information for proximity service (ProSe) communication from at least one of a ProSe Function (PF) and a ProSe Application Server to an announcing user equipment (A-UE), wherein the discovery class information indicates an associated pool of resources for ProSe communication, wherein the transmission of the discovery class information is made from the ProSe application server to the A-UE as application layer signaling; and
   transmitting the discovery class information for ProSe communication from at least one of the PF and the ProSe Application Server to a monitoring UE (M-UE), wherein the transmission of the discovery class information is made from the ProSe application server to the M-UE as application layer signaling.

4. An apparatus for wireless communication, comprising:
   means for transmitting discovery class information for proximity service (ProSe) communication from at least one of a ProSe Function (PF) and a ProSe Application Server to an announcing user equipment (A-UE), wherein the discovery class information indicates an associated pool of resources for ProSe communication, wherein the transmission of the discovery class information is made from the PF to the A-UE in response to a first discovery request from the A-UE; and
   means for transmitting the discovery class information for ProSe communication to a monitoring UE (M-UE), wherein the transmission of the discovery class information is made from the PF to the M-UE in response to a second discovery request from the M-UE.

5. An apparatus for wireless communication, comprising:
   means for transmitting discovery class information for proximity service (ProSe) communication from at least one of a ProSe Function (PF) and a ProSe Application Server to an announcing user equipment (A-UE), wherein the discovery class information indicates an associated pool of resources for ProSe communication, wherein the transmission of the discovery class information sent to the A-UE comprises a set of discovery class rules, the discovery class information being transmitted from the PF to the A-UE as a part of service authorization of the A-UE; and means for transmitting the discovery class information for ProSe communication to a monitoring UE (M-UE), wherein the transmission of the discovery class information sent from the PF to the M-UE comprises the set of discovery class rules, the discovery class information being transmitted to the M-UE as a part of service authorization of the M-UE.

6. An apparatus for wireless communication, comprising:
means for transmitting discovery class information for proximity service (ProSe) communication from at least one of a ProSe Function (PF) and a ProSe Application Server to an announcing user equipment (A-UE), wherein the discovery class information indicates an associated pool of resources for ProSe communication, wherein the transmission of the discovery class information is made from the ProSe application server to the A-UE as application layer signaling; and means for transmitting the discovery class information for ProSe communication to a monitoring UE (M-UE), wherein the transmission of the discovery class information is made from the ProSe application server to the M-UE as application layer signaling.

7. A method of wireless communication comprising:
receiving discovery class information for Proximity Service (ProSe) communication from at least one of a ProSe Function (PF) and a ProSe Application Server, wherein the discovery class information indicates an associated pool of resources for ProSe communication, wherein the discovery class information is received at an announcing user equipment (A-UE); and using the received discovery class information for at least one of transmitting and monitoring ProSe communication, wherein the A-UE uses the discovery class information to select a pool of ProSe resources according to the discovery class information for transmission of ProSe communication.

8. A method of wireless communication comprising:
receiving discovery class information for Proximity Service (ProSe) communication from at least one of a ProSe Function (PF) and a ProSe Application Server, wherein the discovery class information indicates an associated pool of resources for ProSe communication, wherein the discovery class information is received at a monitoring user equipment (M-UE); and using the received discovery class information for at least one of transmitting and monitoring ProSe communication, wherein the M-UE uses the discovery class information to select a pool of ProSe resources according to the discovery class information for monitoring of ProSe communication.

9. A method of wireless communication comprising:
receiving discovery class information for Proximity Service (ProSe) communication from at least one of a ProSe Function (PF) and a ProSe Application Server, wherein the discovery class information indicates an associated pool of resources for ProSe communication, wherein the discovery class information is received as at least one of:

a discovery class allocation from the PF in response to a discovery request;

a set of discovery class rules received from the PF as a part of service authorization; and a discovery class received as application layer signaling from the ProSe application server; and using the received discovery class information for at least one of transmitting and monitoring ProSe communication.

10. An apparatus for wireless communication comprising:
means for receiving discovery class information for Proximity Service (ProSe) communication from at least one of a ProSe Function (PF) and a ProSe Application Server, wherein the discovery class information indicates an associated pool of resources for ProSe communication, wherein the discovery class information is received at an announcing user equipment (A-UE); and means for using the received discovery class information for at least one of transmitting and monitoring ProSe communication, wherein the A-UE uses the discovery class information to select a pool of ProSe resources according to the discovery class information for transmission of ProSe communication.

11. An apparatus for wireless communication comprising:
means for receiving discovery class information for Proximity Service (ProSe) communication from at least one of a ProSe Function (PF) and a ProSe Application Server, wherein the discovery class information indicates an associated pool of resources for ProSe communication, wherein the discovery class information is received at a monitoring user equipment (M-UE); and means for using the received discovery class information for at least one of transmitting and monitoring ProSe communication, wherein the M-UE uses the discovery class information to select a pool of ProSe resources according to the discovery class information for monitoring of ProSe communication.

12. An apparatus for wireless communication comprising:
means for receiving discovery class information for Proximity Service (ProSe) communication from at least one of a ProSe Function (PF) and a ProSe Application Server, wherein the discovery class information indicates an associated pool of resources for ProSe communication, wherein the discovery class information is received as at least one of:

a discovery class allocation from the PF in response to a discovery request;

a set of discovery class rules received from the PF as a part of service authorization; and a discovery class received as application layer signaling from the ProSe application server; and means for using the received discovery class information for at least one of transmitting and monitoring ProSe communication.

* * * * *